Nov. 9, 1965 E. E. MALLORY ETAL 3,216,879
TIRE BUILDING APPARATUS
Filed Dec. 27, 1961 6 Sheets-Sheet 4
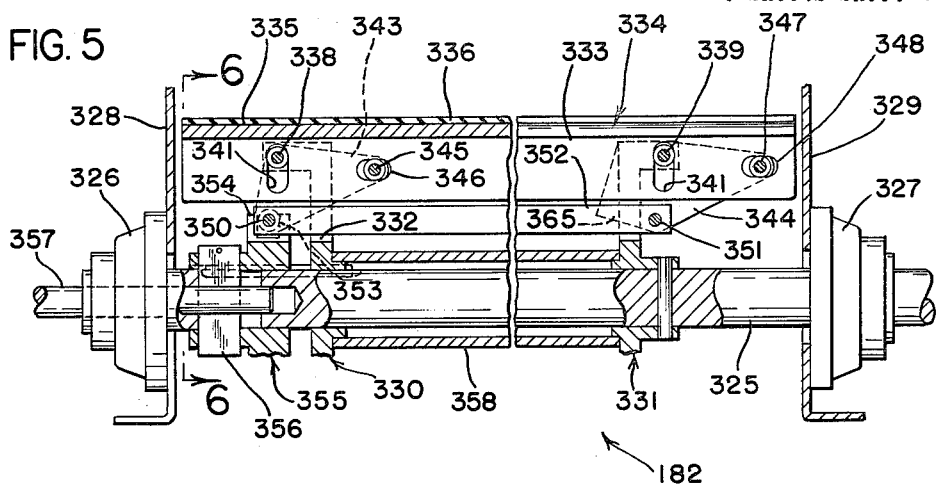
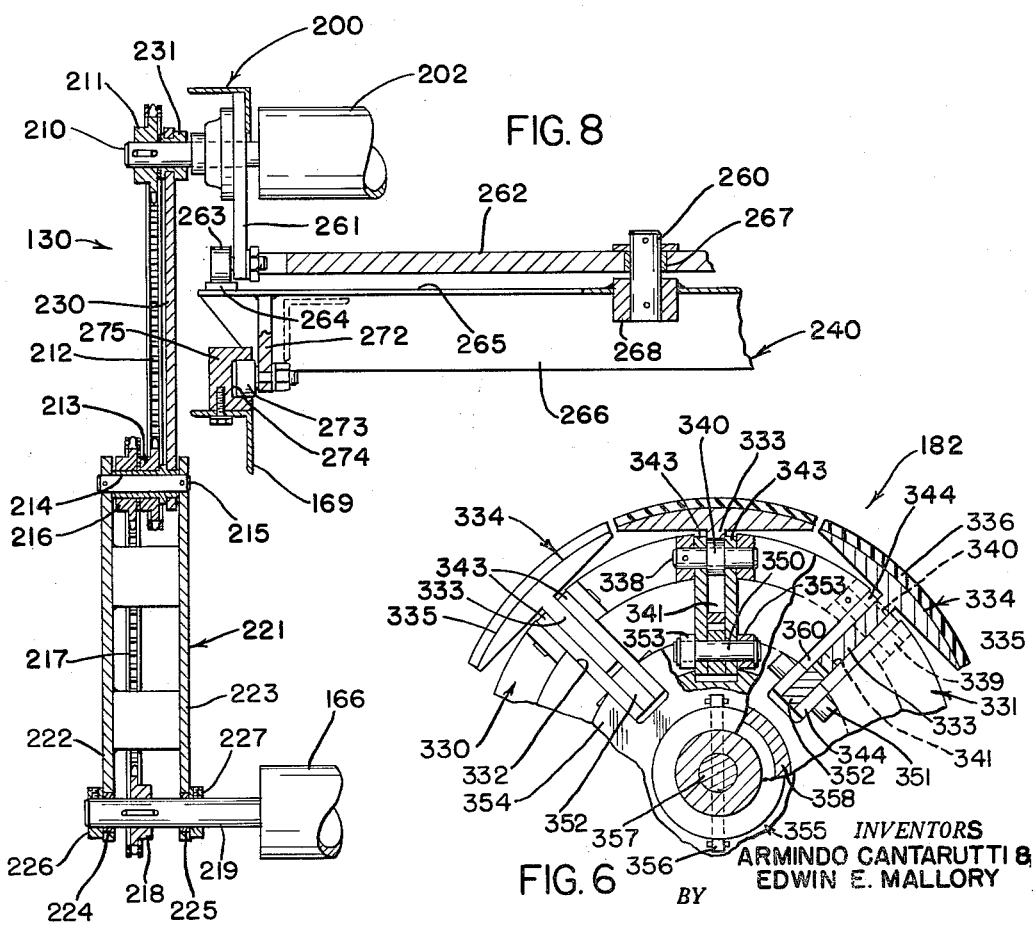
INVENTORS
ARMINDO CANTARUTTI &
EDWIN E. MALLORY
BY Oberlin, Maky & Donnelly
ATTORNEYS Nov. 9, 1965    E. E. MALLORY ETAL    3,216,879
TIRE BUILDING APPARATUS
Filed Dec. 27, 1961    6 Sheets-Sheet 5

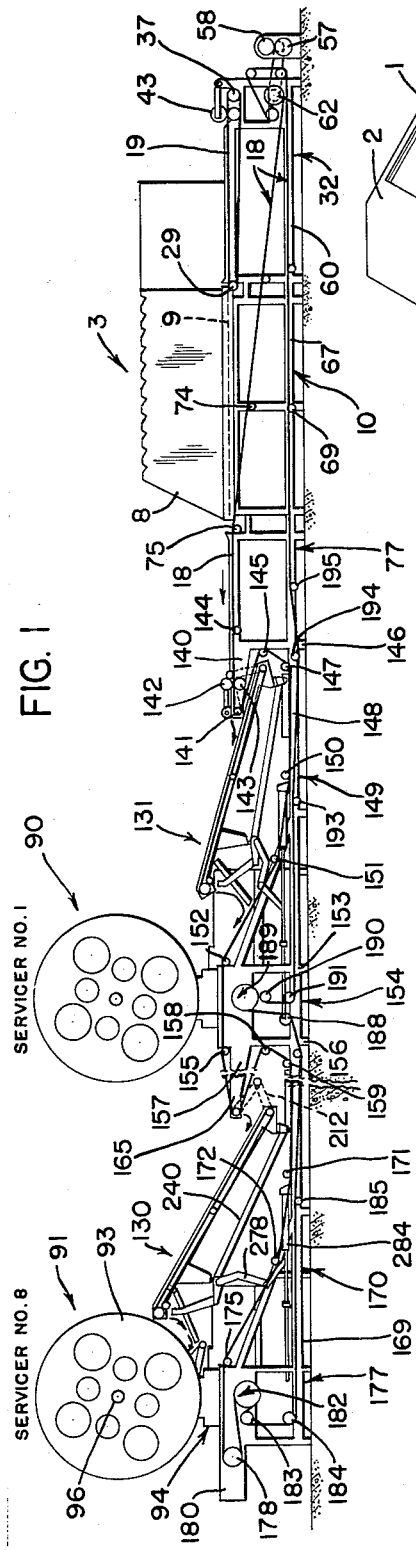

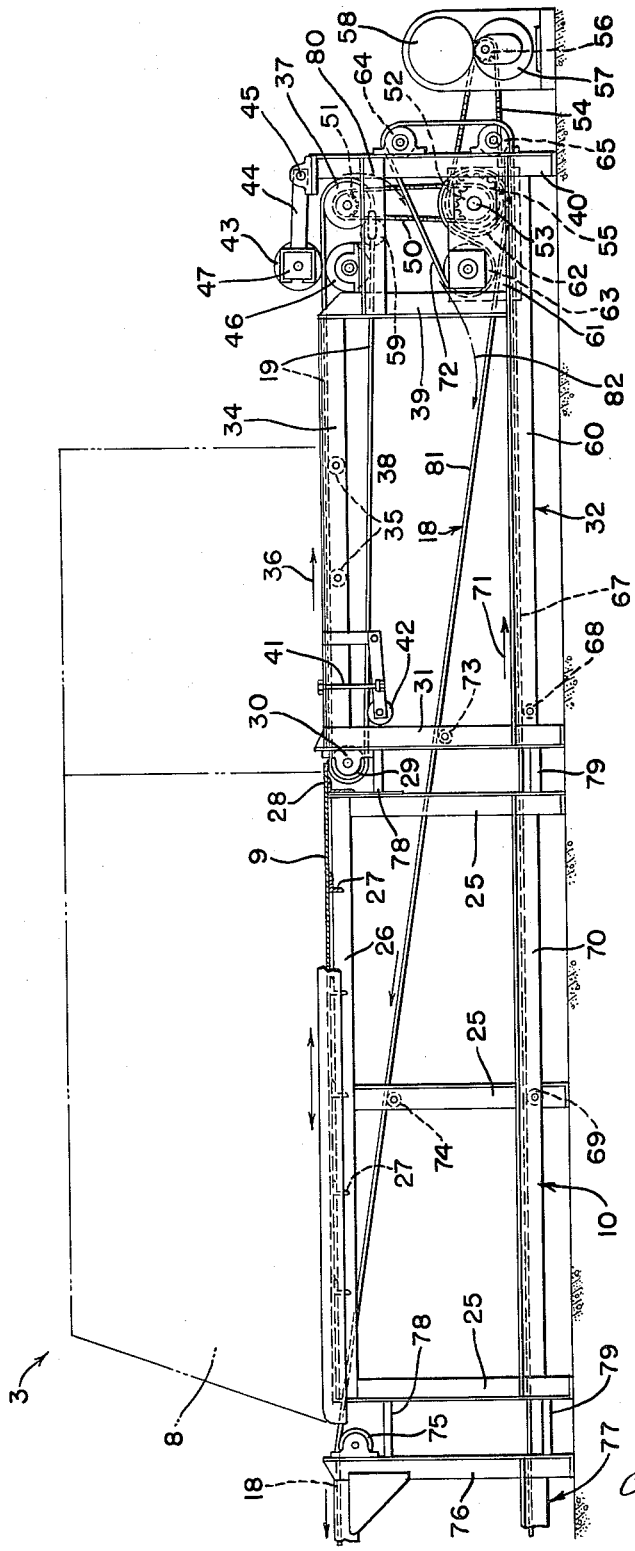

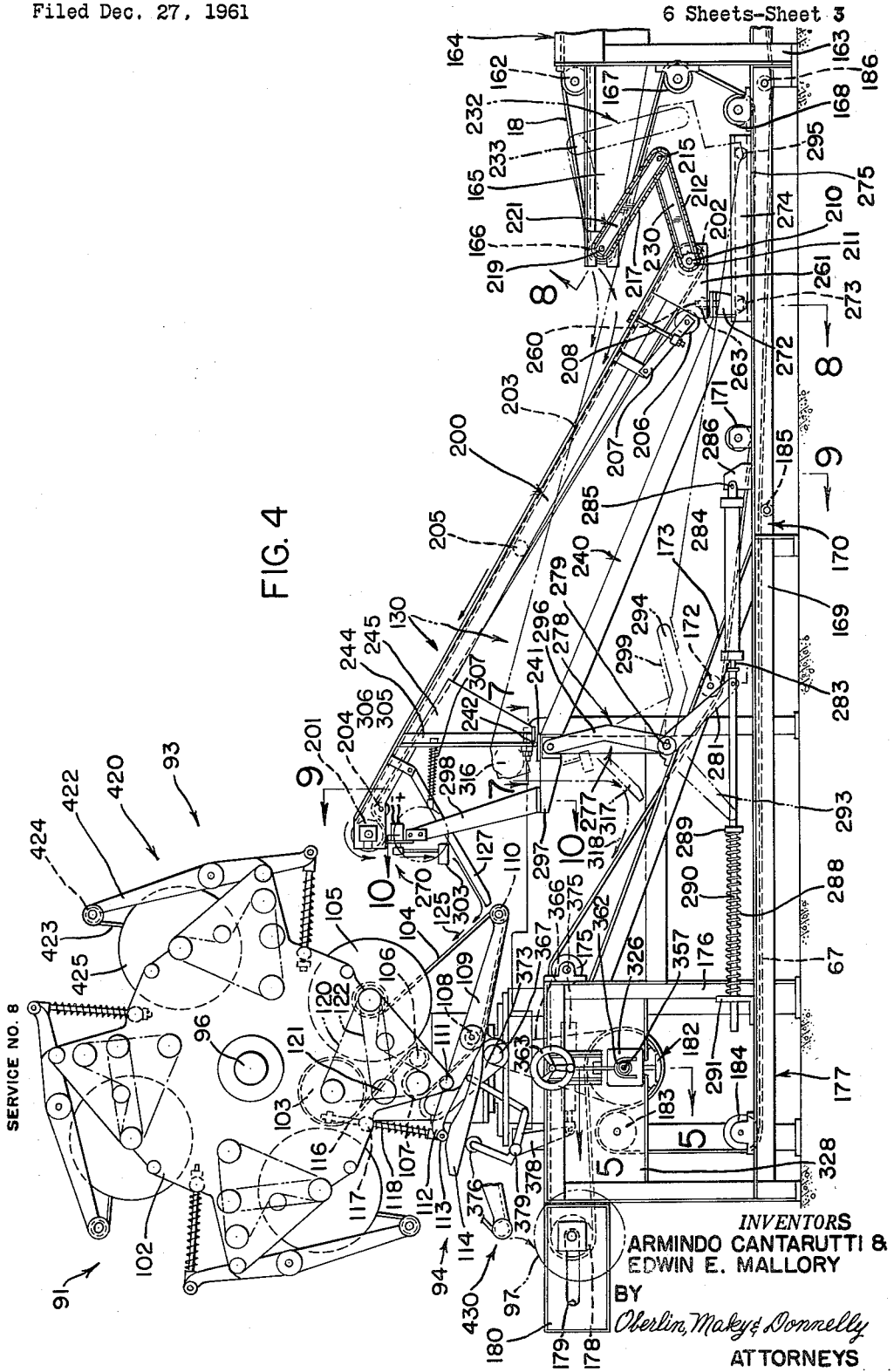

INVENTORS
ARMINDO CANTARUTTI &
EDWIN E. MALLORY
BY Oberlin, Maky & Donnelly
ATTORNEYS INVENTORS
ARMINDO CANTARUTTI &
EDWIN E. MALLORY
BY
Oberlin, Maky & Donnelly
ATTORNEYS United States Patent Office 3,216,879
Patented Nov. 9, 1965

3,216,879
TIRE BUILDING APPARATUS
Edwin E. Mallory and Armindo Cantarutti, Cuyahoga Falls, Ohio, assignors to NRM Corporation, a corporation of Ohio
Filed Dec. 27, 1961, Ser. No. 162,720
29 Claims. (Cl. 156—406)

This invention relates generally, as indicated, to tire building apparatus and more particularly to apparatus for the preparing, sorting, and storing of tire building materials for convenient access to tire building machines.

The construction of tire carcasses on the conventional collapsible drum tire building machines requires the delivery to such drum of many different strips of tire building materials and the tire cord reinforced fabric which comprises the plies of the carcass must be delivered to the drum so that each successive ply has the cords thereof biased in opposite directions. Moreover, the fabric must be delivered to the drum in such a manner as to preclude unevenness or stretching of the fabric material which results in defective tires. The complexity of conventional tire building machines makes it difficult to apply directly to the drum at the proper drum synchronized speed the many required strips of tire materials including the cord reinforced tire fabric.

Rotatable reels including a plurality of fabric storage drums have been employed for the delivery of tire fabric to such tire building machines. It has, however, been an extremely difficult and arduous task requiring much manual handling of the fabric to feed such fabric into the drums. With cumbersome drum feeding methods, it is difficult to program the production schedules of various tire building machines and this results in uneconomical use of expensive tire building equipment. Moreover, with present systems, it is impossible completely to automate the preparation, sorting, storage and delivery of such tire fabric to tire building machines.

It is accordingly a principal object of the present invention to provide apparatus for building tires which will increase the efficiency of drum type tire building machines.

It is a further main object to provide tire building apparatus which will prepare, sort, and store for convenient delivery to such tire building machines large quantities of cord reinforced tire fabric.

It is another object to provide such tire building apparatus which can be programmed automatically to deliver such tire fabric in a selected width and length to the storage drums of a tire servicer for a selected tire building machine.

Another object is to provide such apparatus which will deliver the cord reinforced fabric to the drums of the servicer properly centered and at the properly synchronized speed.

Yet another object is the provision of apparatus which can quickly and conveniently deliver cord reinforced tire fabric with the cords biased in opposite directions to successive storage drums of tire building machine servicers.

Still another object is the provision of such tire building apparatus capable of complete automation so that the tire fabric can automatically be prepared, sorted and stored in the servicers for many tire building machines to effect a tight predetermined schedule of tire production.

A further important object is the obtaining of greater quality uniformity while yet increasing the speed of production of tires.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a schematic elevation on a substantially reduced scale of apparatus in accordance with the present invention partially broken away;

FIG. 2 is a top plan view of the apparatus of FIG. 1;

FIG. 3 is an enlarged elevation detail view of the right-hand portion of FIG. 1 with the details of the high table bias cutter shown only in outline;

FIG. 4 is a similar enlarged detail view of the left-hand end of FIG. 1;

FIG. 5 is an enlarged fragmentary section taken substantially on the line 5—5 of FIG. 4 showing the details of the synchronizing drive pulley for each of the tire servicers;

FIG. 6 is a further enlarged fragmentary detail section taken substantially on the line 6—6 of FIG. 5;

FIG. 8 is a fragmentary detail section taken substantially on the line 8—8 of FIG. 4, expanded and inverted for clarity of illustration showing the flexible drive to the proximal end of the servicer loading conveyor sections;

*General arrangement*

Figure 9:
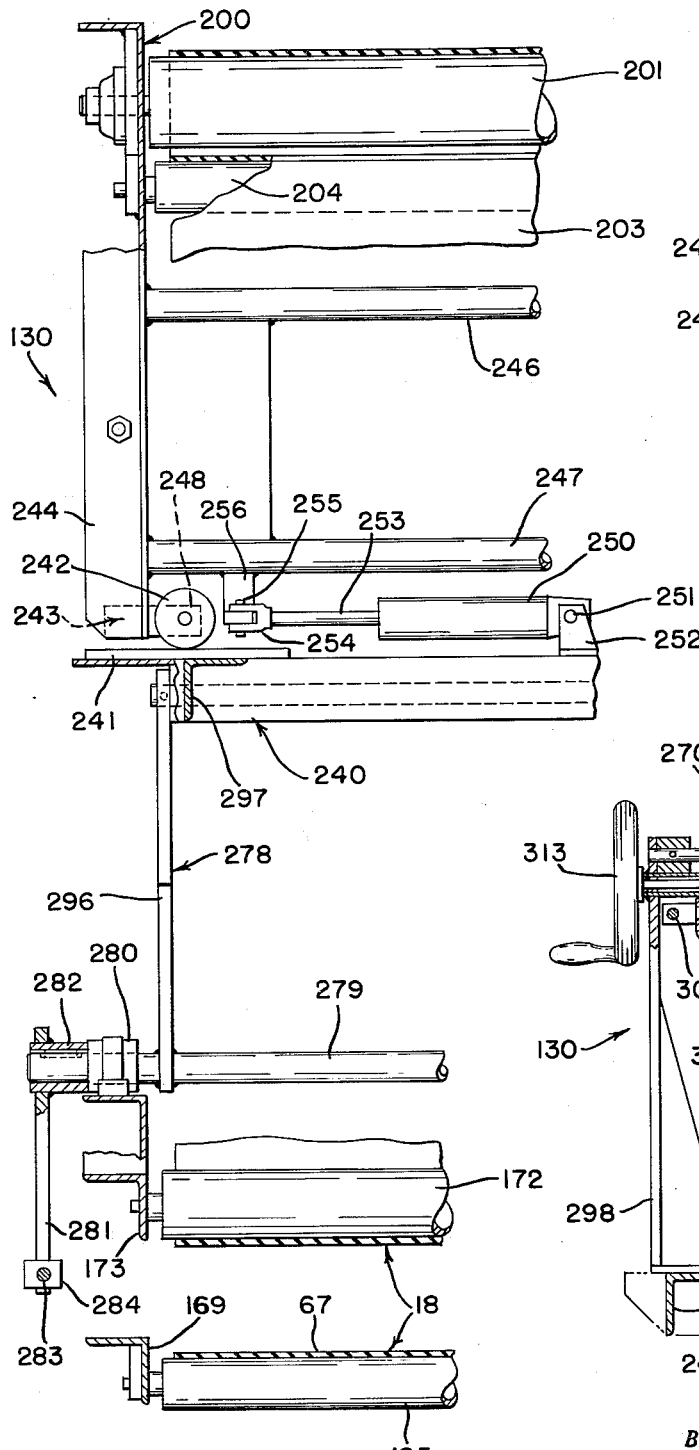
FIG. 9 is an enlarged fragmentary detail section taken substantially on the line 9—9 of FIG. 4.
Figure 7:
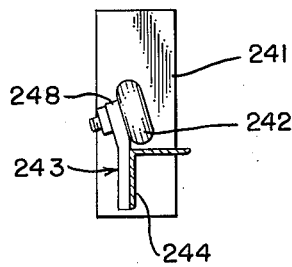
FIG. 7 is a detail section taken substantially on the line 7—7 of FIG. 4.

Referring now to the annexed drawings and more particularly to the general arrangement of the illustrated apparatus in FIGS. 1 and 2, it will be seen that a large roll of cord reinforced tire fabric material 1 of, for example, about 5 feet in width, may be mounted on an uncoiling stand 2 to be payed out on a high table bias cutter shown generally at 3.

The ply stock fabric is of a relatively flimsy nature and the reinforcing cords therein will extend longitudinally of the strip being payed from the roll 1 in the direction of the arrow 4. The top of the table 3 is provided with a plurality of conveyor belts 5 of different length which convey the material beneath the cutter 6. The bias cutter 6 is mounted for reciprocation on a track 7 extending across the table 3 at an angle to the longitudinally extending reinforcing cords. The angle and position of the cutter 6 and the track 7 on which it is mounted may be adjusted accurately to control the bias angle and width of the severed sections of such fabric. An accurate sensing mechanism may be employed to determine the length of the fabric that has passed beneath the cutter to energize the cutter through its complete cycle severing such fabric to the desired width. Such bias cutters are generally conventional and it will be understood that the bias cutter may be a flying severing mechanism which travels at the speed of the work to make the cut for a continuous paying out of the strip or the drive for the conveyor belts 5 may be halted during the actual severing operation.

It will be understood that more than one roll 1 may be positioned to feed the bias cutter 3. For example, the respective rolls and stands may be arranged in tandem with means to feed the fabric from the respective rolls to the table top to facilitate the quick selection of fabric type to suit the tire requirements. When scheduled production calls for different types of tires, the plies might be required to be of different fabric types.

The conveyor belts 5 of different lengths terminate at the top of a downwardly sloping apron 8 to deposit the severed fabric sections on the top surface 9 of a table 10. An adjustable guide bar 14 connected to the edge of the table 10 by a parallelogram linkage 15 may be employed to act as a stop for the severed sections of tire fabric 16 which slide down the apron 8 onto the table surface 9. The guide bar 14 may be employed to center the severed sections of tire fabric 16 with respect to conveyors 18 and 19 extending in opposite directions from the table 10. The guide bar 14 is, of course, adjustable to accommodate varying widths of the tire fabric sections as governed by the bias cutter 6.

Both of the conveyors 18 and 19 may be belts which extend from the table 10 substantially horizontally aligned with the top surface 9 thereof. If desired, an operator may be positioned at the table 10 whose primary function is to join the severed sections of tire fabric to form one continuous length and to feed these thus formed strips onto the respective belt conveyors 18 and 19. Since it is understood that the tire fabric is a relatively flimsy tacky material, the end edges 20 and 21 thereof may easily be lapped to and joined with the opposed edge of an adjoining section of tire fabric. Once the strip is fed onto the desired conveyor, the joined section 16 will be pulled from the table surface 9. The operator at the table 10 may also be provided with a control regulating the speed at which the severed sections of tire fabric are severed and dropped to the table 10 by the bias cutter 3. It will also be understood that automatic mechanisms may be employed for joining the severed sections of tire fabric, either in the lap joint as accomplished manually, or preferably in a butt joint to avoid overlapping plies which can contribute to irregularities in the ply structure of the finished tire. For example, the nature of the material being handled would permit the formation of a butt joint through the application of a pressing roll or like instrumentality. In any event, the joint need only be sufficient to maintain the severed sections of tire fabric in a continuous length for storing and delivery to the tire building machine.

Referring now additionally to FIG. 3, it will be seen that the table 10 may be comprised of a plurality of legs 25 supporting the table top 9 adjacent the horizontal bottom edge of the apron 8. In effect, the top surface 9 of the table 10 is a continuation of the surface of apron 8. The table top 9 may be supported on a top frame 26 and angle supports 27 may be employed further to rigidify the surface 9. The top 9 projects beyond the legs 25 as shown at 28 and a conveyor roll 29 may be nested under the end edge of the top 9 having the conveyor belt 19 wrapped therearound. The roll 29 may be mounted on pillow blocks or the like 30 which are in turn mounted on legs 31 of conveyor stand 32. The top frame 34 of the stand 32 is provided with belt supporting rollers 35 supporting the belt 19 in its top horizontal flight for movement away from the top 9 in the direction of the arrow 36. The belt 19 is also wrapped about a driven roller 37 which is mounted on frame 38 spaced somewhat below the top frame 34. Vertically extending frame members 39 support one end of the frame 38 and the opposite end is supported on legs 40. The conveyor belt 19 is thus trained about the idler roll 29 and the drive roll 37 at opposite ends of the stand 32 with the horizontal top flight thereof being supported by idler rolls 35 in the top frame 34.

The tension of the belt may be adjusted by means of the screw 41 supporting the pivotally mounted tension roll unit 42. A pressing roll 43 is pivotally mounted on arms 44 which are pivoted at 45 to the tops of the legs 40. The pressing roll 43 engages the top surface of the belt 19 and, of course, the tire fabric thereon. The undersurface of the top flight is supported by a back-up roll 46 so that the rolls 43 and 46 will cooperate to form in effect a squeeze roll assembly for the belt and tire fabric pressing the same to remove surface irregularities, etc. The pressure of the roll 43 may be controlled by the size of a weight 47. The back-up roll 46, like the drive roll 37, may be mounted on the frame 38.

The drive for the roll 37 and thus the conveyor belt 19 is effected through a chain 50 trained about a sprocket 51 on the shaft of roll 37 and also a sprocket 52 secured to a shaft 53. The drive of the shaft 53 is obtained by means of a chain 54 trained about a sprocket 55 on such shaft and also a smaller sprocket 56 on the output shaft of a speed reducer 57 driven by motor 58. Such motor may, for example, be a variable speed motor. An idler sprocket 59 may be mounted in a horizontally extending slot in the frame 38 to maintain the chain 50 at the proper tension. The drive illustrated may, for example, double the speed of the shaft 53.

The bottom horizontally extending frame members 60 on which the upstanding frame portion 39 is mounted, cooperates with such upstanding frame, the horizontal frame 38, and the legs 40 to provide a mounting for the drive and idler rollers for the drive end of conveyor belt 18. Plates 61 on each side of the stand 32 support the shaft 53 for rotation which has mounted thereon the drive pulley 62 for the conveyor belt 18. Such plates also support a relatively large diameter idler pulley 63 which is fairly close to the drive roller 62 and about which the belt 18 is trained in the S-shape fashion shown. Legs 40 support idler rolls 64 and 65 in the manner shown.

The belt 18 will move in its horizontal bottom flight 67 supported on idler rolls 68 adjacent the legs 31 and idler rolls 69 in the lower horizontal frame 70 of the table 10 in the direction of the arrow 71. The belt 18 will then pass about the roller 65 and over the top of the roller 64 and along the downwardly inclined path 72; about a large extent of the periphery of idler roll 63 and about an even larger extent of the periphery of the drive roll 62; and thence in an upwardly inclined direction over the support roll 73 journalled in legs 31; support roll 74 journalled in the middle legs 25 of the table 10 and over the top of idler roll 75 supported on legs 76 of conveyor stand 77. When the belt passes over the top of the idler roll 77, it will be substantially horizontally aligned with the table top 9. The diameters of the respective drive rolls 37 and 62 may be directly proportional to pitch diameters of the respective drive sprockets 51 and 52 so that the belts 19 and 18 will be travelling at the same speed. The conveyor stands 32 and 77 adjacent the table 10 may be tied into such table by connecting members as shown at 78 and 79 so that a continuous conveyor supporting frame or stand is provided. With the drive arrangement shown, it is possible to place as many as 22 sections of the severed tire fabric on the belt in continuous strip form for delivery to a selected one of many available tire fabric storage drums.

The operator can feed the strip of tire fabric in either direction from the table 9 and if the fabric is fed in the direction of the conveyor belt 19, it will fall from the end thereof as shown by the arrow 80 to be deposited on the inclined portion 72 of the belt 18 above the drive roller 62 to be in effect flipped over so that the bias of the cords therein will be extending in the opposite direction. The tire fabric will then fall from the inclined portion 72 onto the upwardly inclined portion 81 of the belt 18 as shown by the arrow 82 and pass upwardly beneath the table top 9 and continue to move with the path of the belt 18 in the same manner as if the fabric had been deposited on the belt 18 directly from the table top 9 with the exception that the cords are now biased in the opposite direction.

In any event, tire fabric material travelling on top of the belt 18 away from the table 10 will be fed to a selected storage drum of a plurality of tire building machine servicers shown, for example, at 90 and 91. The illustrated servicers which form the subject matter of our copending application, Serial No. 162,762, entitled "Tire Building Apparatus," filed even date herewith, each comprise two "Ferris wheels" shown at 92 and 93 for the servicer 91, for example. Each of the ferris wheels are mounted on an upstanding frame 94 on horizontally extending shafts 95 and 96 respectively and are provided with drives for intermittent selective rotation about a common horizontal axis. The upstanding frame 94 is mounted for rotation about a vertical central axis to position each of the Ferris wheels in either the unloading position shown for the Ferris wheel 92 wherein the tire fabric material is adapted to be fed onto a tire building drum 97 of a drum type tire building machine, or in the loading position shown for the Ferris wheel 93 wherein the tire fabric material is adapted to be fed into the various drums from the conveyor 18. The drums 97 of each of the tire building machines serviced by the respective servicers are driven through a control mechanism shown generally at 98 and in addition to the tire fabrics fed to such drums by the Ferris wheels, tread stock may be fed to the drums on the roller conveyors shown at 99 and breaker and chafer units may also be employed, usually positioned beneath the tread stock conveyor to feed the requisite tire building materials to the drums 97.

It is noted that the conveyor system feeding the various servicers is broken away so that, in effect, the conveyor system of the belt 18 may be employed to load as many servicers as desired. The conveyor system may easily handle as many as eight such servicers of the four ply, two station type. Thus with the present cutting, preparing, sorting and distribution system, tire fabric may be fed to as many as eight tire building machines and the respective servicers.

Although the details of the Ferris wheels generally form no part of the present invention, a brief description thereof appears in order and referring to FIG. 4, it will be seen that the wheel 93 comprises side plates 102 having journalled therein four sets of tire fabric storage drums although six or more sets may be used depending on the tire construction. One set of drums is provided for each ply of the four ply tire to be built on the drum 97 of the tire building machine. Each of the four sets is identical in form and only the set shown in the loading position will be described in detail. Because of the tacky nature of the tire fabric material, a liner is employed which is stored on drum or roll 103 and such liner 104 is utilized to separate the adjacent convolutions of the tire fabric wound on the stock roll 105. The liner extends from the liner roll 103 about an idler 106 positioned closely adjacent a drive roll which, for example, may be a 4¾ inch rubber covered roll 107. From the drive roll, the liner extends about a tensioning roll 108 mounted on a pair of arms 109 and an idler roll 110 mounted at the distal end of such arms 109 and thence about the stock roll 105. The arms 109 are pivoted to the side frame or plates 102 as shown at shaft 111 and are mounted on such pivot shaft for oscillatory movement as a unit. The inner arm is provided with an extension 112 having a cam follower 113 thereon which engages the top cam surface of cam 114 to pivot the arms 109 as a unit from a retracted position to an extended position. A rod 116 is slidably mounted in the inner frame 102 as shown at 117 and a compression spring 118 positioned about the rod 116 tends to pivot the arms 109 to their retracted position. When the Ferris wheel is indexed about the horizontal axis of the shaft 96 by a suitable intermittent drive mechanism, such as a Geneva wheel, not shown, in a clockwise direction as viewed in FIG. 4, the cam follower 113 will ride radially inwardly due to the action of the cam 114 compression spring 118 to pivot the arms 109 to the extended position shown. As the Ferris wheel continues around and the follower 113 leaves the cam 114, the spring 118 will urge the arms to the retracted position as shown in the position of the other three sets of tire fabric storing rolls. The drive roll 107 is connected by a cog belt 120 to the shafts of both the liner roll 103 and the stock roll 105 to drive them simultaneously. A winding shaft has a cog belt pulley 121 thereon which meshes with cog belt 122 also to drive the stock drum or roll 105. The cog belt pulley 121 may be employed to wind up or pay out the liner 104 in synchronism with the extension and retraction of the arms 109. A unique arrangement of cam and slip clutches may be employed so that the liner 104 will be driven in the direction of the arrow 125 at the loading side to coil the tire fabric delivered to the servicer about the selected storage drum. The drive for the liner will be synchronized with the speed of delivery of the tire fabric as hereinafter described.

At the unloading or tire building drum side of the servicer, the roller 110 at the distal end of the arms 109 will be positioned adjacent the top periphery of the tire building drum 97 so that when the liner is driven in the opposite direction as shown by the arrow 125, the tire fabric will be fed onto the tire building drum. The speed at which the liner is driven to unload the fabric from the stock drum will be synchronized with the speed of the drum 97 as hereinafter described. A cam will also be provided on the unload side to cause the arms to pivot to extend the roller 110.

At the loading side, when the arms 109 are extended, the roller 110 will be positioned adjacent the tip of a downwardly inclined loading apron or pan 127 of a loading conveyor 130. There will be a loading conveyor for each of the tire servicers which are serviced by the conveyor belt 18. For example, the servicer 90 for the first tire building machine in the row will also be provided with a loading conveyor shown generally at 131 in FIG. 1. These loading conveyor sections of the system will be identical in form and for this reason, only the loading conveyor 130 will be described in detail.

The loading conveyors 130, 131 is mounted for movement from an extended servicer loading position, shown by the full lines in FIG. 4, to a retracted servicer by-pass position, shown by the phantom lines in FIG. 4 and also the position of loading conveyor 131 in FIG. 1. In this manner, tire fabric material travelling on the belt 18 away from the table 10 can selectively be fed into any one of the stock drums of any of the eight servicers positioned adjacent the belt 18.

The path of the belt 18 is then such that it will feed the tire fabric stock to the load conveyors, and depending on the positions of such conveyors, the stock will either be fed to the selected servicer drum or be fed back to the belt 18 for conveyance to the next servicer load conveyor and so on.

As seen in FIG. 1, the conveyor stand 77 is provided with a cantilevered section 140 having a conveyor roll 141 on the end thereof. Pressing rolls 142 and 143 may be mounted on the cantilevered section and serve the same function as the pressing rolls 43 and 46 shown in FIG. 3. The belt 18 rides over an idler roll 144 about the roll 141, and then back beneath the cantilevered section 140 and about roll 145 mounted on the leg 146 of the stand 77. From the roll 145 the belt passes beneath a roll 147 mounted on a horizontal frame member 148 of the conveyor stand 149 for the load section conveyor 131. From there, the belt passes beneath rolls 150, 151 and over roll 152 mounted on the leg 153 of conveyor stand 154 adjacent the first servicer 90. From the roll 152 the belt 18 passes over an idler roll 155 mounted on leg 156 of the stand 154. The stand 154 is also provided with a cantilevered section 157 having an idler roll mounted on the end thereof about which the belt 18 is entrained to extend over the belt of the load conveyor section of the next servicer. The belt then passes about idlers 158 and 159 which serve the same function as the idlers 145 and 147.

Now referring additionally to FIG. 4, it will be seen that the belt 18 passes over roller 162 on the leg 163 of the conveyor stand 164 which is positioned adjacent the penultimate servicer, or in the illustrated embodiment, servicer No. 7, as the stand 154 is positioned adjacent servicer No. 1. The stand is provided with a cantilevered section 165 having a roll 166 mounted on the distal end thereof about which the belt 18 is trained. From the roll 166, the belt 18 passes about idlers 167 and 168 which correspond to the idlers 145 and 147. The idler roller 168 may be mounted on pillow blocks or the like on horizontally extending frame member 169 of conveyor frame section 170 for the load section conveyor 130. The belt 18 passes beneath idlers 171 and 172, the latter being mounted on upwardly inclined frame members 173. From the idler 172, the belt 18 passes upwardly and over idler 175 mounted on legs 176 of conveyor stand 177 adjacent servicer No. 8. The belt 18 then passes through the final stand 177 and about tail pulley or roller 178 mounted in horizontal adjusting slots 179 in cantilevered frame 180. The belt 18 now commences its return trip first by passing about a large extent of the periphery of adjustable diameter servicer drive roll 182 journalled in the stand 177, then about idler roll 183 adjacent thereto, then down about idler 184 mounted on the continuation of horizontal frame 169 and then back, generally aligned with such frame 169, over idler 185, under ilder 186 and into the stand 164.

As illustrated in FIG. 1 for the servicer No. 1, the return path of the belt passes beneath idler 188 and around the greater extent of the periphery of servicer drive pulley 189, about idler 190 adjacent thereto and idler 191, the bottom of which is substantially aligned with the horizontal return path of the belt 18. The belt 18 thus passes through each of the stands adjacent the servicers in such manner to drive the adjustable diameter servicer drive roll therein in the manner indicated and after leaving the stand 154, the belt passes over idler 193, under idler 194, over idler 195 in stand 77 and then over idler 69 in table 10 as seen more clearly in FIG. 3. The belt then returns to be wrapped about the drive roll 62 driven by the motor 58. It is noted that a further conveyor or storage mechanism may be placed beneath the cantilevered portion 180 of the frame or stand 177 so that if the tire fabic is not removed from the conveyor by any of the servicer loading conveyor sections, it can be further transported or removed for storage, etc.

Servicer loading conveyors

Referring now more particularly to FIG. 4 and the detail views, FIGS. 7, 8, 9 and 10, it will be seen that the loading conveyor 130, which is identical in form to all of the loading conveyors, comprises a main frame 200 supporting for rotation an idler roller 201 at the distal end thereof and a belt drive roller 202 at the proximal end thereof with loading conveyor belt 203 trained thereabout. The frame 200 also journals therein idler rollers 204 and 205, the former supporting the belt in its return or down flight and the latter supporting the belt in its upwardly included loading flight. Tension roller 206 mounted on arms 207 may be adjustably engaged with the belt 203 by the adjustment screws 208 to maintain the belt at the proper tension.

Referring to FIGS. 4 and 8, it will be seen that the drive for the roll 202 is obtained from the roll 166 driven by the belt 18. The shaft 210 of the drive roller 202 has a sprocket 211 keyed to the end thereof. A drive chain 212 trained about such sprocket is also trained about sprocket 213 mounted for rotation on bushing 214 on shaft 215. A sprocket 216 identical in form to the sprocket 213 is connected thereto for rotation as a unit therewith by, for example, three roll pins and such sprocket 216 has chain 217 trained thereabout and about sprocket 218 keyed to shaft 219 of the roll 166. The rolls 202 and 166 are preferably of the same diameter and the sprockets 211, 213, 216 and 218, being identical in form, will drive the roller 202 at exactly the speed of roller 166 so that the belt 203 will be driven at exactly the speed of the belt 18.

The intermediate shaft 215 is supported by a frame 221, the legs 222 and 223 of which are provided with bushings 224 and 225 so that such frame may pivot on the shaft 219. Collars 226 and 227 held to the shaft 219 by set screws as shown maintain the frame in the proper longitudinal position. In addition to the sprockets 213 and 216, the bushing 214 also supports a link 230 at its proximal end, the distal end being secured to collar 231 rotatably mounted on shaft 210. In this manner, an articulated drive linkage is provided for the drive roll 202 which permits such roll to be moved horizontally feneath the cantilevered portion to the position shown 164. Thus as the conveyor drive roll 202 is moved back beneath the cantilevered portion to the position shown at 232, the shaft 215 will pivot upwardly to the position shown at 233. There will be sufficient play in the pivots of the three pivot drive linkages to permit a slight amount of skewing of the roll 202 with respect to the roll 166.

The main frame 200 of the conveyor 130 is mounted on a secondary or support frame 240 which extends in an upwardly inclined direction as does the frame 200. Adjacent the top of the support frame 240, there is provided two support platforms 241 at each side of the conveyor frame supporting rollers 242. These rollers are mounted on brackets 243 (see FIG. 7) secured to downwardly projecting frame portions 244 of the frame 200. Gusset plates 245 or the like may be employed to rigidify the downwardly projecting frame members 244. Tubular reinforcing members 246 and 247 may be provided extending between the downwardly projecting angle frame members 244 further to rigidify the same (note FIG. 9). The brackets 243 may be canted outwardly as shown at 248 and it will be understood that the roller on the opposite side will also be canted outwardly or in the same direction as in FIG. 7.

A piston-cylinder assembly 250 has its blind end pin-connected at 251 to a bracket 252 to the frame 240 between the platforms 241. The rod 253 of the piston-cylinder assembly is provided with a clevis 254 and is pin-connected at 255 to a downwardly extending arm bracket 256 on the tube 247 which is a rigid part of the main frame 200. Extension and retraction of the piston-cylinder assembly 250 will cause the main frame 200 to pivot about the vertical axis of pin 260 shown in FIG. 8.

The frame 200 at its proximal end includes side plates 261 and a relatively thick bottom plate 262. The side plates and bottom plates are secured together to form a rigid proximal frame for the conveyor frame 200 and the plates 261 are provided with support rollers 263 which ride on rails 264 on platform 265 provided by the transverse framing member 266 of the support frame 240. The pin 260 is mounted in a bushing 267 in the plate 262 and is secured in a boss 268 in the frame member 266 of the support frame. Thus the frame 200 is supported at its proximal end on the rollers 263 and at its distal end on the rollers 242. This mounting of the main conveyor frame 200 permits a slight pivotal movement of such conveyor with respect to the supporting frame 240 about the vertical axis of pin 260. As will hereinafter be described, this pivotal movement of the loading conveyor permits a fabric edge position responsive mechanism shown generally at 270 to control the movement of rod 253 and thus the movement of frame 200 with respect to frame 240 to control the centering of the tire fabric on the inclined apron portion of the liner 104 leading to the drum 105 so that the fabric will be properly centered within the drum and be properly centered when payed therefrom to be deposited on the tire building machine drum 97 with the cords therein all parallel to each other and biased in the desired direction.

The transverse frame member 266 of the support frame 240 is provided with downwardly extending roller brackets 272 on each side thereof (FIG. 8) supporting rollers 273 thereon. These rollers fit within elongated slots 274 in rail members 275 secured to the top of conveyor stand frame member 169.

The distal end of the frame 240 is supported on a pair of links 277 and 278 which are secured to and rotate with shaft 279 mounted for rotation in pillow blocks 280 or the like secured to inclined frame members 173. A crank arm 281 is secured to a hub 282 which is keyed to such shaft. The distal end of such arm is pivoted to the rod 283 of piston-cylinder assembly 284, the blind end of which is pivoted at 285 to brackets 286 secured to frame member 169. An extension 288 of rod 283 is provided with a collar 289 and a compression spring 290 extending between such collar and bracket 291. The bracket 291 which is secured to the frame member 169 slidably receives the rod 288 and cooperates with the collar to compress the spring upon extension of the rod 283. The rod 283 which is shown in its retracted position, when retracted will be effective to raise the support frame 240 from the phantom line position to the full line position shown. In the retracted or phantom line position, the crank arm 281 will move to the position shown at 293 and the arm 278, for example, will move to the position shown at 294. When the arm moves about the axis of shaft 279, the rollers 273 will slide along the rails 275 to the position shown at 295.

It is noted that the arm 278 is offset as shown at 296 to clear bracket 297, which supports a stanchion 298 mounting the edge position responsive control 270 thereon, in the retracted or phantom line position shown in FIG. 4 indicated at 299. It can now be seen that when the piston-cylinder assembly 284 is extended, the crank 281 will move to the dotted line position 293 and the arms 277 and 278 will pivot about the axis of shaft 279 to move the loading and centering conveyor 130 to the retracted or by-pass position shown in phantom lines. When the rod 283 is retracted, the assistance of the spring 290 will permit the piston-cylinder assembly readily to raise the conveyor 130 to its full line or servicer loading position.

Figure 10:
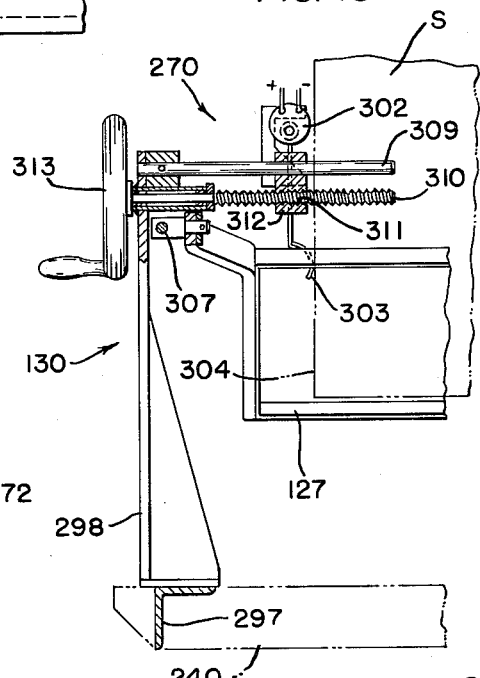
FIG. 10 is a fragmentary section taken substantially on the line 10—10 of FIG. 4 showing the edge position responsive control for the loading conveyor section.

Referring now to FIG. 10, in addition to FIG. 4, it be seen that the control 270 mounted on the stanchion 298 comprises a switch mechanism 302 which is actuated by an edge feeler 303 having a sensitive edge contacting distal end adapted to engage the edge 304 of the tire fabric stock S as it drops from the belt 203 trained about the top roll 201 to inclined apron 127 which is pivoted at 305 to bracket 306 depending from the frame 200. spring loaded push rods 307 resiliently support the discharge apron 127 in its extended position.

The control switch 302 is mounted for horizontal adjustment on a rod 309 extending from the stanchion 298. An adjusting screw 310 passes through a threaded aperture 311 in the switch support block 312 and by rotating the screw 310 by means of hand wheel 313, the horizontal position of control switch 302 may be carefully selected. A scale and pointer may preferably be employed with such adjusting mechanism which can be set for different width tire fabric. The switch support block 312 will freely slide along the horizontal extending guide bar 309 as the result of the turning of screw 310. The switch mechanism 302 is employed to actuate suitable valving mechanisms controlling the piston-cylinder assembly 250. For example, should the switch actuator 303 be moved to the left in FIG. 10 by the edge of stock S, the switch mechanism will function to retract the piston-cylinder assembly 250 causing the tire fabric to move to the right in FIG. 10 due to the swinging movement of the conveyor about the pin 260. Similarly, if the sensitive contact 302 should be permitted to move to the right to follow the edge of the stock S, the piston-cylinder assembly 250 will be extended moving the stock to the left in FIG. 10. In this manner, the strip of tire fabric is maintained centered with respect to the main support frame 240 and thus the liner 104 leading into the stock storage drum 105. It will, of course, be understood that in place of the switch mechanism shown, a conventional light source and photocell unit may be employed to control the piston-cylinder assembly 250.

It can now be seen that in the extended position, the tip of the apron or pan 127 will be closely above and adjacent the roller 110 on the arms 109 in their extended position so that the strip stock will drop onto the apron 127 and slide down onto the apron formed by the liner to be picked up thereby and wrapped thereabout in the storage drum 105. In both the extended and retracted positions of the conveyor belt 203, the proximal or loading end is disposed beneath the roll 116 of the belt 18 which cantilevers such belt thereover. Thus in either position the tire fabric strip loaded on the belt 18 will drop to the belt 203 to be carried over the roll 201. In the extended position or servicer loading position, the strip will drop onto the pan and the selected liner 104 of the servicer. In the retracted position, the tire fabric will pass over the roller 201 indicated in phantom lines at 316 and drop onto the pan 127 indicated in phantom lines at 317. From the pan, the tire fabric will then pass directly back onto the belt 18 as shown by the arrow 318. In the phantom line by-pass position for the loading conveyors for the servicers Nos. 1 through 7, the tire fabric will merely pass on to the next servicer loading conveyor and in the final loading conveyor as shown in FIG. 4, the tire fabric will drop off the end of the conveyor 18 over the roller 178 for further storage, etc.

*Synchronizing drives*

We have already seen how the belts 18, 19 and 203, all driven from the same source of power, are synchronized to travel at the same speeds. Since it is desirable that the tire fabric be not buckled or stretched in the manipulation thereof including the storage on the drums 105, it then becomes desirable to synchronize the loading conveyors with the drive of the liners 104 for each of the units of the Ferris wheel of the servicers. The drive for the liners is obtained from the variable diameter pulley 182 in the conveyor stand 177 which is adjacent the servicer. It will, of course, be understood that the adjustable diameter pulley 189 will perform a similar function for the servicer No. 1 and each of the servicers in the line will similarly take their drive from the belt 18 through similar adjustable diameter servicer drive pulleys.

As shown in the detail views FIGS. 5 and 6, the adjustable diameter pulley 182 is mounted on a shaft 325 which is in turn rotatably mounted in bearings 326 and 327 secured to respective side plates 328 and 329 in the stand 177. Secured to the shaft 325 for rotation therewith are two fixed spiders 330 and 331 having a plurality of radially extending slots 332 therein. The radially extending slots 332 of each of the fixed spiders 330 and 331 accommodate the radially inwardly extending T-stem flanges 333 of a plurality of shoes 334 which have arcuate outer faces 335. Secured to such faces are belt contacting pads 336 which engage the belt 18 wrapped therearound. Bridging the respective slots 332 in the fixed spiders are pivot pins 338 and 339 which have enlarged center bosses 340 which are slidably reecived in vertically extending slots 341 in the stems 333. The pins 338 and 339 also extend through pairs of bell crank links 343 and 344 which are also inside the radially extending openings or slots 332 in the fixed spiders. One end of each of the bell crank links 343 is slidably pin-connected to the stems 333 by the pivot pins 345 in horizontally elongated slots 346 therein. The corresponding ends of the links 344 are similarly connected to the stems 333 by the pins 347 in slots 348. The opposite ends of the pairs of links 343 and 344 are connected by pins 350 and 351 to tie bars 352. The pins 350 are provided with collars 353 on the opposite ends thereof which ride within yokes 354 in a sliding spider 355 connected by key 356 to rod actuator 357. The actuator rod 357, the key 356 and the sliding spider 355 are mounted on the shaft 325 for short distance horizontal reciprocation. The fixed spiders 330 and 331 may be held apart by a spacing tube 358 so that the pivots provided by pins 338 and 339 will be fixed both with respect to each other and radially of the shaft 325. It can now be seen that horizontal movement of the rod 357 will cause movements of the yoke 354 through the sliding spider 355 which will pivot the bell crank links 343 and 344 about the pins 338 and 339 to move the pins 345 and 347 radially outwardly uniformly to increase the diameter of the pulley 182. The pair of links 344 may be provided with projections indicated at 360 to limit the radial movements of the pivot pins 347 and thus the obtainable maximum diameter of the pulley. The tie bar 352 provides a parallelogram linkage ensuring that the pivot pins 345 and 347 will move outward radially uniformly.

As seen in FIG. 4, the push rod 357 may be connected to a yoke 362 which is attached to a screw mechanism actuated by hand wheel 363 so that the diameter of the pulley 182 can carefully be adjusted from, for example, a minimum of 11½ inches to a maximum of 12¾ inches.

Figure 11:
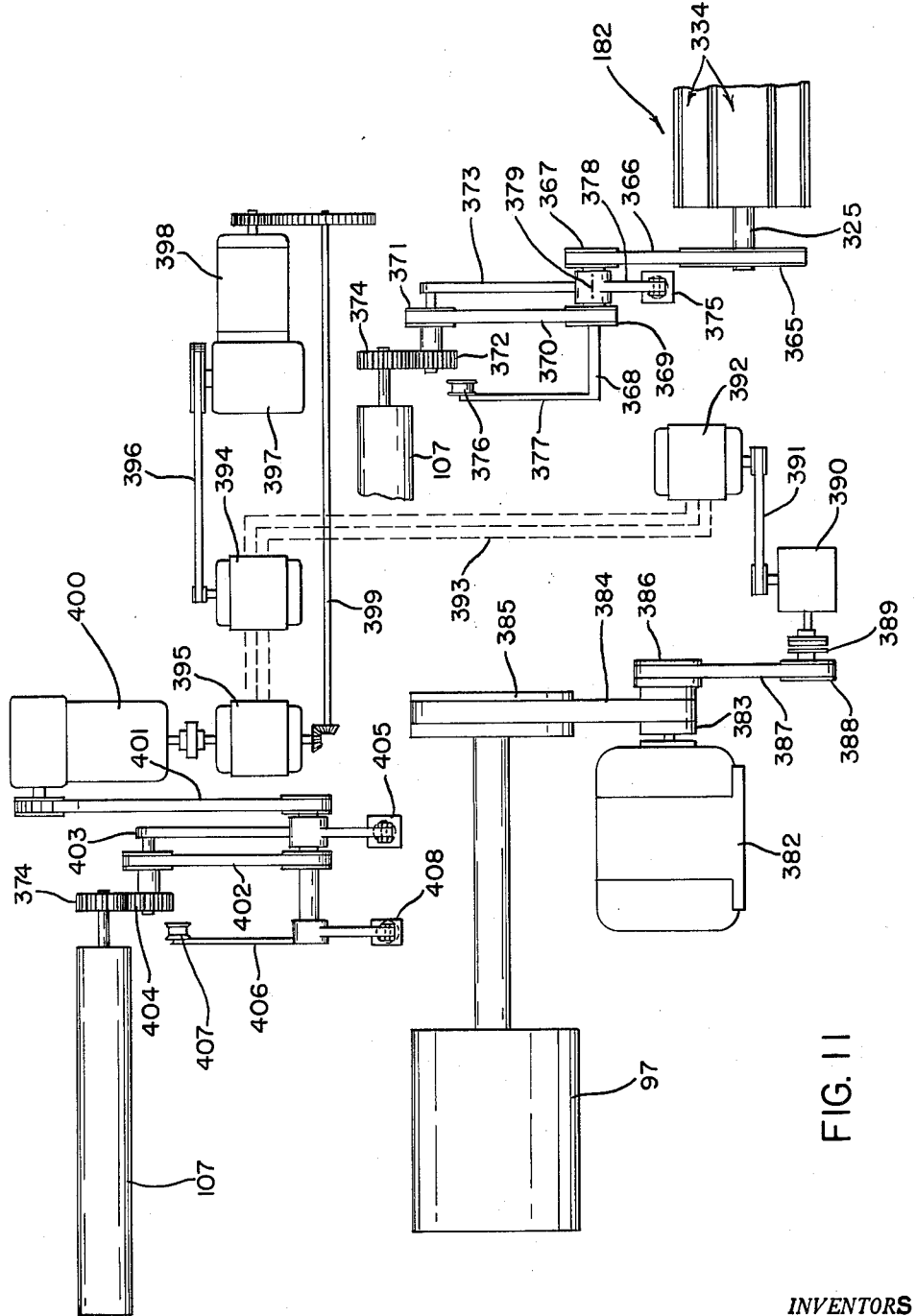
FIG. 11 is a drive and control diagram showing how synchronization of the loading and unloading of the tire servicers is obtained.

As seen in FIG. 11, the shaft 325 of the pulley 182 may be provided with a cog belt pulley 365 connected by a cog belt 366 to a smaller diameter pulley 367 which is mounted on the turntable frame of the servicer 91. The cog belt pulley 367 may be mounted on shaft 368 which is mounted on the top of the support frame for the turntable of the servicer 91. The drive to the cog pulley 367 is imparted to a further cog pulley 369 which is connected by cog belt 370 to cog pulley 371 driving gear 372. The pulley 371 and gear 372 are mounted for oscillation on the end of arm 373 which may be moved from an extended position as shown in FIG. 4 in which the gear 372 engages the gear 374 on the shaft of the liner drive roll 107 to a retracted drive disengaged position and vice versa by a piston-cylinder assembly 375. On the loading side of the servicer, the piston-cylinder assembly 375 may also be employed to move with the arm 373 a cam engaging roller 376 mounted on arm 377. The roller 376 engages the cam 114 to pivot it to a position wherein it will in turn piovt the arms 109 to their extended positions providing a loading apron or pan formed by the liner 104. Thus the piston-cylinder assembly causes movement both of the cam 114 and the arm 373 to extend the liner and to drive the liner from the belt 18 through the liner drive roll 107. It will, of course, be understood that the drive linkage shown in FIG. 11 is somewhat diagrammatic and FIG. 4 more closely illustrates the correct linkage wherein the piston-cylinder assembly 375 is effective to move crank 378 about pivot 379. Suitable linkages are connected to the roller 376 and the arm 373 to cause the proper movement into loading drive position.

The tire building drum 97 is normally driven by motor 382 through a drive comprising a drive pulley 383, a belt 384 and a flat pulley 385. However, with the present invention, the pulley 383 is provided with an extension which includes a cog belt pulley 386 driven by cog belt 387 from pulley 388. An electromagnetic clutch 389, which is normally disengaged except when fabric is being applied to the drum 97 from the servicer, connects the pulley 388 to a gear reducer 390 of, for example, a 20:1 ratio. The gear reducer is driven through belt 391 by a receiver motor 392. The receiver 392 is connected through wiring 393 to a differential 394 which is similarly connected to a transmitter 395. The differential motor is driven by a timing belt 396 on a speed reducer 397 driven by a magnetic clutch 398. The transmitter, receiver, and differential motors may commonly be referred to as Selsyns. The shaft of such clutch 398 may be connected mechanically as by the shaft 399 and appropriate 1:2 gearing to the shaft of transmitter 395 which is coupled to the shaft of a master gear head motor 400. The motor 400 may, for example, be a 2 h.p. 1750 r.p.m. motor and the clutch 398 may then be driven at 3300 r.p.m. The motor 400 drives the liner drive roll 107 in the unloading position through belts 401 and 402, the latter being mounted to pivot with arm 403, the distal end of which supports gear 404 adapted to be placed in mesh with the gear 374 on the liner drive roll shaft by piston-cylinder assembly 405. The piston-cylinder assembly on the unloading or machine side of the servicer thus serves the same function as the piston-cylinder assembly 375 on the loading side of the servicer in that it places the drive gear in mesh with the gear 374 of the liner drive roll. However, on the unloading side, the arm 406 mounting the cam positioning roller 407 thereon may be independently actuated by a separate piston-cylinder assembly 408. In this manner, the drive between gears 404 and 374 can be disengaged without retracting the apron produced by the liner arms 109. In this manner, either or both of the piston-cylinder assemblies on the unload side of the servicer may be operated automatically by the cycling controls of the drum type tire building machine.

It can now be seen that the drive 400 for the liner drive roll 107 in the unloading position will be effective also to drive drum 97 and to control and maintain the proper relative speed of the drum 97 and liner. For example, the liner drive roll 107, being a 4¾ inch diameter roll with a .018 rubber liner making a total of .4759 diameter could be driven at 78 r.p.m. while the drum 97 is driven at only 19.55 r.p.m. It will, of course, be understood that as the liner and plies are added to the drum 97, its effective diameter will increase and the drum r.p.m. may then be reduced accordingly. This reduction in the r.p.m. of the drum can easily be obtained through the synchrodifferential servo system shown in FIG. 11.

Thus a speed increase is obtained from the adjustable pulley 182 to the liner drive roll 107 on the loading side due to the variance in the diameters of the drive roll and pulley and on the output or unloading side a speed decrease is obtained again due to the relative diameters of the liner drive roll and the drum 97.

*Operation*

Reviewing now the operation of the apparatus disclosed with special reference to FIGS. 1, 2 and 4, it will be seen that a coil of the tire fabric material 1 is fed into the bias cutter shown generally at 3 with the cords extending longitudinally of the tire fabric generally in the direction of the arrow 4 in FIG. 2. The bias cutter, which can be controlled automatically or by the operator at table 10, severs the tire fabric into the rhomboid-shape segments shown generally at 16. These segments slide from the belts 5 down the apron 8 onto the surface 9 of the table 10 and are aligned by the stop bar 14. Such strips are then joined end-to-end to form a generally continuous strip S and can be fed from the table in either direction, to be placed directly on the conveyor belt 18 or onto the conveyor belt 19 moving in the opposite direction. The operator may simply lap the adjacent rhomboid-like strips together to form the continuous strip, the tacky nature of the material permitting a joint sufficient for the purposes of storing and applying such fabric to the tire building drum. It will, of course, be understood that a machine automatically may be employed to join the segments of tire fabric. If the strip S is fed onto the belt 19, it will be flipped over by the conveyor mechanism shown in more detail in FIG. 3 so that the cords of the strip will be biased in a direction opposite to that which they would be biased were the strip fed directly onto the belt 18.

In any event, the strip now moves beneath the pressing roll 142 to be cantilevered over and dropped onto the loading end of the first servicer loading and centering conveyor. A programming through a central control system will be employed to feed the tire fabric to the selected storage drum in any one of the eight servicers. This means that the tire fabric may be selectively fed to any one of sixty-four fabric storage drums since each of the eight servicers will include a total of eight such drums. If each of the tire building machines is building six ply tires, for example, each of the Ferris wheels of the servicers may include six tire fabric storage drums, a total of twelve for each servicer, and thus ninety-six fabric storage drums may be fed or serviced by the conveyor belt 18. For example, if the programming selects the Ferris wheel 93 of the servicer 91, or servicer No. 8, all of the loading and centering conveyors of the servicers No. 1 through 7 will be retracted to the by-pass position and the operator at table 10 may then feed a strip S of selected length over the seven retracted loading and centering conveyors. Such strip will pass along the belt 18 to the stand 164 of servicer No. 7 to be dropped over the roller 166 onto the upwardly inclined loading conveyor 130 which has been moved to its loading position by retraction of the piston-cylinder assembly 284. The selected drum 105 will be positioned in the loading position by rotating the Ferris wheel about its horizontal axis and the cam 114 actuated by the piston-cylinder assembly 375 will be effective to cause extension of the arms 109 to position the liner 104 in the loading apron forming position shown in FIG. 4. The strip then passes over the top roll 201 and drops past the edge position detector 303 and slides down the pan 127 to be picked up by the liner 104 and coiled about the drum 105. The piston-cylinder assembly 375 also pivots the arm 373 to the drive position to drive the liner drive roll 107 and thus the liner 104 at a synchronized speed with the loading conveyor belt 203. The edge detector 303 will control the piston-cylinder assembly 250 to pivot the loading and centering conveyor about the pin 260 properly to center the tire fabric with respect to the liner 104 and thus the drum 105. When the strip of the selected length has been wound on the drum 105, the Ferris wheel 93 may then be indexed in a clockwise direction as seen in FIG. 4 to position the next fabric storage unit 420 in the lowermost or loading position. The cam follower 421 of such unit will ride up the cam 114 to pivot the arms 422 downwardly so that the liner 423 will form the loading apron. It is noted that the piston-cylinder assembly 284 need not be extended to retract the loading conveyor since the spring-loaded pan 127 will permit the distal roller 424 readily to swing to the position shown by the roller 110. When the next drum is in loading position, a strip of tire fabric positioned on the belt 18 by means of the belt 19 will then pass up the loading conveyor belt 203 to be stored on the drum 425. By virtue of the construction of the belt 19, the tire cords of the strip stored in drum 425 will be biased in the opposite direction as the cords of the fabric stored in the drum 105. The operator at table 10 may space successive strips so that the belt 18 may operate continuously and all that is required then is the indexing of the servicer to position the next storage drum in the loading position. While the Ferris wheel 93 is thus being loaded, the operator of the drum 97 may be unloading the Ferris wheel 92. When the Ferris wheel 92 is empty and the Ferris wheel 93 is full, the operator will index the servicer about the vertically extending center axis to place the empty Ferris wheel in position for loading and the full Ferris wheel in position to feed fabric to the drum 97. The tire fabric drums, of course, need not be completely empty before being swung to the loading position since the production schedules may be such as to require loading of that particular Ferris wheel at a particular time.

It can now be seen that there is provided tire building apparatus which permits a more efficient use of the plurality of tire building machines in that each can continuously be supplied with the proper tire fabric material stored in the proper order. Moreover, with the conveying apparatus, it is possible selectively to store the prepared fabrics in a manner best to suit the production schedules of the various machines. A single production line can thus be fed continuously with the preselected tire fabric which is cut on the proper bias and pieced together to form strips and such fabric strips can be delivered from the table 10 with the biased cords extending parallel to each other in alternately opposite directions. With such production advantages, it is possible to produce tires faster with less effort and yet obtain greater quality and uniformity.

Other modes of applying the principle of the invention may be employed, change being made as regards the details described, provided the features stated in any of the following claims or the equivalent of such be employed.

We, therefore, particularly point out and distinctly claim as our invention:

1. Tire building apparatus comprising a bias cutter, means to feed tire fabric having longitudinally extending reinforcing cords to said bias cutter to sever obliquely such fabric, means to discharge the severed fabric to a conveyor feed table where such severed fabric sections can be joined to form a substantially continuous strip wherein the cords of such fabric are parallel to each other and biased at an angle with respect to the direction of elongation of such strip, a plurality of drum type tire building machines, a tire servicer for each said machine comprising horizontally extending Ferris wheels mounted for rotation about a vertically extending central axis, each said Ferris wheel comprising a plurality of tire fabric storage drums, and means to feed such strip of tire fabric from said conveyor feed table selectively to any one of said tire fabric storage drums.

2. Tire building apparatus as set forth in claim 1 wherein said last-mentioned means comprises belt conveyor means leading away from said feed table, a plurality of loading and centering conveyors for each said servicer, and means to elevate selectively each said loading and centering conveyor from a servicer by-pass position to a servicer loading position.

3. Tire building apparatus as set forth in claim 2 wherein said belt conveyor means is cantilevered over the loading end of each said loading and centering conveyor in both the by-pass and loading positions thereof.

4. Tire building apparatus as set forth in claim 3 wherein each said loading and centering conveyor is mounted for swinging movement about a vertically extending axis, and means responsive to the position of the edge of such tire fabric discharged from said loading and centering conveyor in the loading position thereof to pivot said conveyor about said vertically extending swing axis thus to center such fabric with respect to said storage drums.

5. Tire building apparatus as set forth in claim 4 including conveyor belt speed responsive drive means for each said storage drum.

6. Tire building apparatus as set forth in claim 1 wherein said last mentioned means comprises conveyor means leading away from said feed table, loading and centering conveyors for each said servicer, a liner for each storage drum, and means to project the liner for the selected storage drum to receive such tire fabric discharged from the respective loading and centering conveyor.

7. Tire building apparatus as set forth in claim 6 including means at said conveyor feed table to invert such strips of tire fabric so that the cords thereof are biased in the opposite direction.

8. Tire building apparatus as set forth in claim 7 wherein said conveyor means extends beneath said conveyor feed table, said means to invert such strips comprises a further conveyor extending from said conveyor feed table in a direction opposite to that of said first-mentioned conveyor means, and means to discharge and invert such strips of tire fabric from said further conveyor to said first-mentioned conveyor means to be conveyed to the selected storage drum.

9. Tire building apparatus as set forth in claim 6 including means to drive each loading and centering conveyor at the same speed as said conveyor means.

10. Tire building apparatus as set forth in claim 2 wherein said means to elevate said loading and centering conveyors from a by-pass to a loading position comprises a spring assisted piston-cylinder assembly.

11. Tire building apparatus as set forth in claim 3 including means mounting said loading and centering conveyor on rail means extending beneath the cantilevered portion of said belt conveyor means so that as the loading and centering conveyor is brought to the by-pass position, the loading end will slide beneath the cantileverd portion of said belt conveyor means.

12. Tire building apparatus as set forth in claim 4 including a platform supporting each said loading and centering conveyor, roller means on said loading and centering conveyors riding on said platforms, and a piston-cylinder assembly interconnecting said platform and loading and centering conveyor to pivot the latter about said pin, 13. Tire building apparatus as set forth in claim 5 wherein said belt speed responsive drive means comprises an adjustable diameter pulley engaged by said conveyor belt means, a swingably mounted drive arm having a drive gear on the distal end thereof driven by said adjustable diameter pulley, a liner drive roll for the liner of the selected storage drum having a gear on the shaft thereof, and means selectively to swing said drive arm to engage and disengage said gears.

14. Tire building apparatus as set forth in claim 13 wherein each liner is mounted on a pair of arms, and cam means to extend said arms and the respective liner when the respective storage drum is in loading position.

15. Tire building apparatus as set forth in claim 6 including means to drive the liner at the same speed as the respective loading and centering conveyor.

16. Tire building apparatus as set forth in claim 6 including a stand for said conveyor means and each said servicer loading and centering conveyor, said stand including a plurality of idler rolls to deflect said belt conveyor around the loading end of each said servicer loading and centering conveyor and in an upwardly inclined path to receive tire fabric discharged from said loading and centering conveyors in the by-pass position thereof.

17. Tire building apparatus as set forth in claim 6 including drive means for the respective loading and centering conveyors each comprising articulated chain drive linkages connecting said conveyor means with the respective loading and centering conveyors.

18. Tire building apparatus comprising a plurality of drum type tire building machines, a servicer for each said machine, said servicer comprising axially aligned oppositely extending Ferris wheels having tire fabric storage drums therein, and means automatically to feed a strip of tire fabric having biased cords therein to a selected storage drum of a servicer of a selected tire building machine.

19. Tire building apparatus comprising a conveyor feed table, means to form on said table an elongated strip of tire fabric having the cords thereof biased, a plurality of drum-type tire building machines, servicers for each of said tire building machines including a plurality of fabric storage drums, and means automatically to feed such strip to selected storage drum of a selected servicer.

20. Tire building apparatus comprising a plurality of drum-type tire building machines, servicers for each of said tire building machines comprising a plurality of tire fabric storage drums adapted to be indexed into position to feed fabric to the respective tire building machine, liner means for each said storage drum, means to project said liner means to form a loading apron for the respective storage drum when in loading position, and loading means to feed a strip of such tire fabric to the storage drum when said liner is in extended position.

21. Tire building apparatus as set forth in claim 20 including means to synchronize the drive of said liner and said loading means.

22. Tire building apparatus as set forth in claim 21 wherein said loading means comprises an upwardly inclined conveyor, means mounting said conveyor for swingable movement about a vertically extending axis, and means responsive to the position of the edge of such tire fabric discharged from said conveyor to swing said conveyor about said vertically extending axis to center such fabric with respect to said liner and thus said storage drum.

23. Tire building apparatus as set forth in claim 20 including means to extend said liner when the drum is indexed into tire fabric discharge position adjacent the drum of the tire building machine to form a discharge apron for the fabric adjacent the peripheral surface of the drum of the tire building machine.

24. Tire fabric inverting apparatus comprising a conveyor feed table, a first conveyor extending beneath said feed table and driven to move longitudinally away from said table in a plane substantially even with the top of said table, a second conveyor substantially coplanar with said top of said feed table and driven in a direction opposite to that of said first conveyor, said first conveyor having a downwardly inclined portion adjacent the discharge end of said second conveyor whereby a tire fabric discharged from said second conveyor will be flipped over onto said first conveyor to be delivered beneath said feed table and away from the top surface thereof in a direction opposite to the direction of said second conveyor.

25. Tire fabric handling apparatus comprising a splice table adapted to form strips of tire fabric material having cords therein biased at an angle to the direction of elongation thereof, a first conveyor extending beneath said splice table driven to move longitudinally away from said splice table in a plane substantially even with the top thereof, a second conveyor substantially coplanar with the top of said splice table and driven in a direction opposite to that of said first conveyor, and means at the end of said second conveyor operative to flip over such fabric onto said first conveyor to be delivered beneath said splice table with the cords thereof then biased in the opposite direction.

26. In combination, a tire storage drum, a liner for said storage drum adapted to separate adjacent convolutions of tire fabric wrapped thereon, drive means for said liner, a loading conveyor for said storage drum adapted to discharge strips of tire fabric on said liner, drive means for said conveyor, and means to synchronize said drive means and thus the speed of said loading conveyor with the speed of said liner.

27. In combination, a tire fabric storage drum, a liner for said storage drum adapted to separate adjacent convolutions of a strip of tire fabric wrapped on said drum, a loading conveyor for said storage drum adapted to discharge a strip of tire fabric on such liner to be wrapped on said storage drum, means mounting said loading conveyor for swinging movement with respect to said liner, and means responsive to the position of the edge of such strip to swing said loading conveyor with respect to said liner.

28. The combination set forth in claim 27 including motor means thus to swing said conveyor, sensing means adapted to sense the edge of said strip thus to control said motor means, and means horizontally to adjust the position of said sensing means to accommodate strips of tire fabric of varying width.

29. The combination set forth in claim 28 wherein said horizontal adjustment means comprises a rotatable screw.

References Cited by the Examiner
UNITED STATES PATENTS

| | | | |
|---|---|---|---|
| 2,231,853 | 2/41 | MacDonald | 156—406 |
| 2,253,781 | 8/41 | Haase et al. | 156—406 |
| 2,558,903 | 7/51 | Kastner | 156—406 |
| 2,625,198 | 1/53 | Bostwick | 156—406 |
| 2,918,105 | 12/59 | Harris | 156—395 |
| 3,017,312 | 1/62 | Kraft | 156—395 X |
| 3,019,153 | 1/62 | Noall et al. | 156—406 |

ALEXANDER WYMAN *Primary Examiner.*

HAROLD ANSHER, *Examiner.*